United States Patent
Liu et al.

(10) Patent No.: US 7,171,957 B2
(45) Date of Patent: Feb. 6, 2007

(54) CONTROL STRATEGY FOR EXPANDING DIESEL HCCI COMBUSTION RANGE BY LOWERING INTAKE MANIFOLD TEMPERATURE

(75) Inventors: Zhengbai Liu, Naperville, IL (US); Puning Wei, Naperville, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 11/343,371

(22) Filed: Jan. 31, 2006

(65) Prior Publication Data
US 2006/0200297 A1    Sep. 7, 2006

Related U.S. Application Data

(63) Continuation-in-part of application No. 11/072,549, filed on Mar. 3, 2005, now Pat. No. 7,017,561.

(51) Int. Cl.
*F02M 25/07* (2006.01)
*F02B 47/08* (2006.01)

(52) U.S. Cl. .............................. 123/568.12; 123/568.11

(58) Field of Classification Search ........... 123/568.12, 123/568.11, 568.2, 559.1, 563; 60/605.2, 60/605.3
See application file for complete search history.

(56) References Cited

U.S. PATENT DOCUMENTS

| | | | |
|---|---|---|---|
| 6,571,765 B2 * | 6/2003 | Kuboshima et al. | 123/305 |
| 6,904,898 B1 * | 6/2005 | Sahlen | 123/568.12 |
| 6,918,251 B2 * | 7/2005 | Yanagisawa et al. | 60/605.2 |
| 6,957,640 B1 * | 10/2005 | Liu et al. | 123/305 |
| 2004/0074480 A1 * | 4/2004 | Chen et al. | 123/568.12 |
| 2004/0194463 A1 * | 10/2004 | Yanagisawa et al. | 60/605.2 |

* cited by examiner

*Primary Examiner*—Mahmoud Gimie
(74) *Attorney, Agent, or Firm*—Susan L. Lukasik; Elias P. Soupos; Jeffrey P. Calfa

(57) ABSTRACT

An engine (10, 100) utilizes "regular EGR cooling" when operating in HCCI mode within a low load range and "enhanced EGR cooling" that allows the engine to continue to operate in HCCI mode when engine load increases beyond the low load range. When engine load increases to a high load range, the combustion mode changes over to conventional diesel combustion, and exhaust gas recirculation reverts to "regular EGR cooling". In a first embodiment, cooling is provided by two heat exchangers, one being a regular EGR cooler always used when cooling is needed and the other, an enhancing EGR cooler that is selectively used. In a second embodiment, cooling is also provided by two heat exchangers, one being an EGR cooler through which liquid coolant always flows when cooling is needed, and the other being a radiator used selectively to cool the liquid coolant before it enters the EGR cooler.

16 Claims, 4 Drawing Sheets

CONTROL STRATEGY FOR EXPANDING DIESEL HCCI COMBUSTION RANGE BY LOWERING INTAKE MANIFOLD TEMPERATURE

REFERENCE TO A RELATED APPLICATION AND PRIORITY CLAIM

This application is a continuation-in-part, and claims priority, of application Ser. No. 11/072,549 filed 3 Mar. 2005, now U.S. Pat. No. 7,017,561.

FIELD OF THE INVENTION

This invention relates generally to internal combustion engines, particularly engines that selectively operate in different combustion modes, such as a Homogeneous-Charge Compression-Ignition (HCCI) combustion mode and a Conventional Diesel (CD) combustion mode. The invention provides a strategy for selectively cooling recirculated exhaust gas according to engine speed/load conditions in a manner that enables an engine to operate in the HCCI combustion mode over a larger range of speed/load conditions.

BACKGROUND OF THE INVENTION

HCCI is a known process for fueling a diesel engine in a manner that creates a substantially homogeneous air-fuel charge inside an engine cylinder during a compression upstroke of an engine cycle. After a desired quantity of fuel for the charge has been injected into the cylinder to create a substantially homogeneous air-fuel mixture, the increasing compression of the charge by the upstroking piston creates sufficiently large pressure to cause auto-ignition of the charge. In other words, the HCCI mode of operation of a diesel engine may be said to comprise 1) injecting a desired amount of fuel into a cylinder at an appropriate time during the compression upstroke so that the injected fuel mixes with charge air that has entered the cylinder during the preceding intake downstroke and early portion of the compression upstroke in a manner that forms a substantially homogeneous mixture within the cylinder, and then 2) increasingly compressing the mixture to the point of auto-ignition near or at top dead center (TDC). Auto-ignition may occur as the substantially simultaneous spontaneous combustion of vaporized fuel at various locations within the mixture. No additional fuel is injected after auto-ignition.

One of the attributes of HCCI is that relatively lean, or dilute, mixtures can be combusted, keeping the combustion temperatures relatively low. By avoiding the creation of relatively higher combustion temperatures, HCCI can yield significant reductions in the generation of $NO_x$, an undesired constituent of engine exhaust gas.

Another attribute of HCCI is that auto-ignition of a substantially homogeneous air-fuel charge generates more complete combustion and consequently relatively less soot in engine exhaust.

The potential benefit of HCCI on reducing tailpipe emissions is therefore rather significant, and consequently HCCI is a subject of active investigation and development by scientists and engineers.

One aspect of HCCI seems to impose a limit on the extent to which it can provide drastically reduced tailpipe emissions of soot and $NO_x$. At higher engine speeds and larger engine loads, the rate of combustion is difficult to control. Consequently, known engine control strategies may utilize HCCI only at relatively lower speeds and smaller engine loads. At higher speeds and/or larger loads, the engine is fueled so that the fuel combusts by conventional diesel (CD) combustion.

The nature of a diesel engine and the commercial availability of fuel injection systems that can control fuel injection with great precision allow fuel to be injected as a series of individual injections during an engine cycle. Hence known fueling systems in diesel engines can serve to control injection of fuel for both CD combustion and HCCI combustion.

CD fuel injection during an engine cycle is sometimes described by its particular fueling pulses, such as pilot injection pulses, main injection pulses, and post-injection pulses. Any particular fuel injection process typically always comprises at least one main fuel injection pulse, with one or more pilot and/or post-injection pulses being optional possibilities.

Contemporary fuel injection systems allow injection pressure, injection rate, and injection timing to be controlled with high degrees of precision so that fuel can be injected into a cylinder in precise quantities at precise times during an engine cycle. That is why known fuel injection and associated processing systems can handle both CD and HCCI combustion. An engine that can operate selectively in a CD combustion mode and an HCCI combustion mode depending on factors such as speed and load is sometimes called a hybrid HCCI diesel engine.

Several pending U.S. Patent Applications of the inventors disclose engines, systems, and methods for operating diesel engines selectively in different combustion modes including HCCI and CD modes. Those inventions take advantage of the capabilities of known fuel injection and processing systems to control fuel injections in different ways depending on certain aspects of engine operation. Exactly how any particular fuel injection system will be controlled by an associated processing system in any given engine will depend on specifics of the engine, the fuel injection system, and the processing system.

Because a diesel engine that powers a motor vehicle runs at different speeds and loads depending on various inputs to the vehicle and engine that influence engine operation, fueling requirements change as speed and load change. An associated processing system processes data indicative of parameters such as engine speed and engine load to develop control data for setting desired engine fueling for particular operating conditions that will assure proper control of the fuel injection system for various combinations of engine speed and engine load.

HCCI may be considered one of several alternative combustion processes for a compression ignition engine. Other processes that may be considered alternative combustion processes include Controlled Auto-Ignition (CAI), Dilution Controlled Combustion Systems (DCCS), and Highly Premixed Combustion Systems (HPCS).

By whatever name an alternative combustion system or process may be called, a common attribute is that fuel is injected into a cylinder well before TDC to form an air-fuel charge that is increasingly compressed until auto-ignition occurs near or at top dead center (TDC).

It is commonly known that limiting peak combustion temperatures in an engine can aid in reducing the amount of undesired products of combustion in engine exhaust. Exhaust gas recirculation (EGR) is commonly used in internal combustion engines to aid in limiting peak combustion temperatures. A variety of known EGR strategies are described in various patents and technical literature. The amount of exhaust gas recirculated is typically controlled according to how the engine is being operated. At some times more exhaust gas is recirculated, at other times less.

It is also known to have more than one EGR valve in an engine and to selectively use them according to how the engine is being operated. It is also known to use a heat exchanger to cool recirculated exhaust gas, and when a heat exchanger is used in this way, it is often called simply a cooler.

SUMMARY OF THE INVENTION

The present invention relates to a compression ignition engine that at times operates in an alternative diesel combustion mode like HCCI and that, when operating in that mode, utilizes EGR in a way that enables HCCI to be used over a larger range of engine speeds and loads.

Briefly, the invention utilizes what will be sometimes called "regular EGR" when the engine is operating in HCCI mode at loads within a low load range, and what will be sometimes called "enhanced EGR" that allows the engine to continue to operate in HCCI mode when engine load increases beyond loads in the low load range. When engine load increase further to a point where it enters a high load range, the combustion mode changes over to conventional diesel combustion, and exhaust gas recirculation reverts to "regular EGR".

By extending the load range over which a compression ignition engine can operate in an alternative diesel combustion mode such as HCCI, such an engine can generate less undesirable combustion products in exhaust gases without significantly compromising engine performance.

The invention is embodied by particular programming of an engine control strategy in a processor of an engine control unit and by the inclusion of "enhancing EGR" apparatus that is additional to "regular EGR" apparatus. In accordance with principles of the invention, the "enhancing EGR" apparatus is used in conjunction with alternative diesel combustion when the engine is operating in a medium load range that is between the low load range and the high load range.

In the preferred embodiment of the invention disclosed in application Ser. No. 11/072,549, the "enhancing EGR" apparatus includes an enhancing EGR cooler that provides additional cooling to the exhaust gas that is being recirculated. The additional cooling enables alternative diesel combustion to be used over an expanded load range in a diesel engine by lowering intake manifold temperature. The lowered intake manifold temperature acts to increase gas density, reduce peak pressures, and lower peak temperatures in the engine cylinders, allowing a diesel engine to operate at medium loads in an alternative diesel combustion mode.

Consequently, the invention enables a diesel engine to work in a basic alternative diesel combustion mode, such as HCCI combustion mode, at low loads, in an enhancing alternative diesel combustion mode at medium loads, and in the conventional diesel combustion mode at high loads.

The embodiment disclosed in application Ser. No. 11/072, 549 is repeated here in FIGS. 1 and 2. As can be seen, the "enhancing EGR" apparatus comprises an "enhancing EGR cooler" and an "enhancing EGR valve" that are additional to a "regular EGR cooler" and a "regular EGR valve".

As mentioned above, a cooler is basically a heat exchanger that provides for exchange of heat between two fluids. FIGS. 1 and 2 show that one of the fluids passing through each cooler is recirculated exhaust gas. By controlling the EGR valves in accordance with the principles that have been disclosed, both flow and temperature of EGR are controlled in coordination with fueling to extend the range for alternative diesel combustion.

The present application discloses an additional embodiment that does not necessarily require the use of two EGR valves. Instead, a single EGR valve controls the entire EGR flow through a single EGR cooler in low, medium, and high load ranges of engine operation. Cooling of recirculated exhaust gases is controlled by a flow control circuit that controls the flow of liquid engine coolant passing through the EGR cooler. Hence, the EGR cooler of this additional embodiment is a liquid-to-gas type heat exchanger.

Control of liquid engine coolant flow through the EGR cooler is accomplished by two coolant valves in the flow control circuit. One coolant valve is in series with a radiator to form a first branch of the circuit. The other coolant valve is in a second branch that is in parallel circuit relationship with the first branch. Liquid engine coolant that is cooled as it is being drawn through a main radiator of the engine cooling system by a coolant pump is introduced into the flow control circuit. Depending on engine load and EGR cooling demand, the coolant entering the flow control circuit can either pass through either branch to the exclusion of the other branch, or be apportioned between the two branches, before passing through the EGR cooler. Return flow from the EGR cooler is returned to the engine cooling system.

One generic aspect of the present invention relates to a compression ignition engine comprising a control system comprising a processor for processing data including data indicative of engine load, one or more combustion chambers, an intake system for conveying charge air to the one or more combustion chambers, a fueling system for injecting fuel into the one or more combustion chambers, an exhaust system for conveying exhaust gases from the one or more combustion chambers, and an exhaust gas recirculation system for controlling both recirculation of some of the exhaust gases to the intake system and temperature of recirculated exhaust gases.

The exhaust gas recirculation system comprises valves and heat exchangers arranged in a flow control circuit having a first branch that comprises a first of the valves and a first of the heat exchangers in series, a second branch comprising a second of the valves in parallel with the first branch, and a third branch comprising a second of the heat exchangers through which flow through the first branch and flow through the second branch are constrained to pass.

When a result of the processor processing data indicative of engine load discloses engine load in a low load range, the control system causes the fueling system to fuel the engine for operation by alternative diesel combustion and causes flow through the second and third branches, but not the first branch.

When a result of the processor processing data indicative of engine load discloses engine load in a medium load range comprising loads greater than those of the low load range, the control system causes the fueling system to fuel the engine for operation by alternative diesel combustion and causes flow through the first and third branches, but not the second branch.

When a result of the processor processing data indicative of engine load discloses engine load in a high load range comprising loads greater than those of the medium load range, the control system causes the fueling system to fuel the engine for operation by conventional diesel combustion and causes flow through the second and third branches, but not the first branch.

In one embodiment flow in the flow control circuit comprises recirculated exhaust gases. In another embodiment the flow comprises liquid coolant.

Another generic aspect relates to a method of operating a compression ignition engine that has a control system comprising a processor for processing data and an exhaust gas recirculation system comprising valves and first and second heat exchangers arranged in a flow control circuit for both controlling recirculation of some of the exhaust gases resulting from combustion of fuel injected by a fuel injection system into one or more combustion chambers to an intake system of the engine and controlling temperature of recirculated exhaust gases.

The method comprises operating the processor to process data indicative of engine load, and when a result of the processor processing data indicative of engine load discloses engine load in a low load range, operating the fuel injection system to fuel the engine for operation by alternative diesel combustion and placing the valves in a state that allows flow of a fluid medium through the second heat exchanger and disallows flow of the medium through the first heat exchanger.

When a result of the processor processing data indicative of engine load discloses engine load in a medium load range comprising loads greater than those of the low load range, operating the fuel injection system to fuel the engine for operation by alternative diesel combustion and placing the valves in a state that allows flow of the medium through both the first and second heat exchangers.

When a result of the processor processing data indicative of engine load discloses engine load in a high load range comprising loads greater than those of the medium load range, operating the fuel injection system to fuel the engine for operation by conventional diesel combustion and placing the valves in a state that allows flow of the medium through the second heat exchanger.

Still another generic aspect relates to a method that comprises operating the processor to process data indicative of engine load, and when a result of the processor processing data indicative of engine load discloses engine load in a first load range, operating the fuel injection system to fuel the engine for operation by alternative diesel combustion and configuring the flow control circuit to a first circuit configuration that endows the circuit with a capacity for cooling the recirculated exhaust gases appropriate to the first load range for enabling alternative diesel combustion in the first load range.

When a result of the processor processing data indicative of engine load discloses engine load in a second load range comprising loads greater than those of the first load range, operating the fuel injection system to fuel the engine for operation by alternative diesel combustion and configuring the flow control circuit to a second circuit configuration that is different from the first circuit configuration and endows the circuit with a capacity for cooling the recirculated exhaust gases appropriate to the second load range for enabling alternative diesel combustion in the second load range.

When a result of the processor processing data indicative of engine load discloses engine load in a third load range comprising loads greater than those of the second load range, operating the fuel injection system to fuel the engine for operation by conventional diesel combustion and configuring the flow control circuit to a circuit configuration that is different from one of the first and second circuit configurations.

Still another generic aspect relates to a compression ignition engine comprising a control system comprising a processor for processing data including data indicative of engine load, one or more combustion chambers, an intake system for conveying charge air to the one or more combustion chambers, a fueling system for injecting fuel into the one or more combustion chambers, an exhaust system for conveying exhaust gases from the one or more combustion chambers, and an exhaust gas recirculation system, comprising a re-configurable flow control circuit, for controlling both recirculation of some of the exhaust gases to the intake system and temperature of recirculated exhaust gases.

When a result of the processor processing data indicative of engine load discloses engine load in a first load range, the fuel injection system fuels the engine for operation by alternative diesel combustion and the control system configures the flow control circuit to a first circuit configuration that endows the circuit with a capacity for cooling the recirculated exhaust gases appropriate to the first load range for enabling alternative diesel combustion in the first load range.

When a result of the processor processing data indicative of engine load discloses engine load in a second load range comprising loads greater than those of the first load range, the fuel injection system fuels the engine for operation by alternative diesel combustion and the control system configures the flow control circuit to a second circuit configuration that is different from the first circuit configuration and endows the circuit with a capacity for cooling the recirculated exhaust gases appropriate to the second load range for enabling alternative diesel combustion in the second load range.

When a result of the processor processing data indicative of engine load discloses engine load in a third load range comprising loads greater than those of the second load range, the fuel injection system fuels the engine for operation by conventional diesel combustion and the control system configures the flow control circuit to a circuit configuration that is different from one of the first and second circuit configurations.

The foregoing, along with further features and advantages of the invention, will be seen in the following disclosure of a presently preferred embodiment of the invention depicting the best mode contemplated at this time for carrying out the invention. This specification includes drawings, now briefly described as follows.

BRIEF DESCRIPTION OF THE PREFERRED EMBODIMENT

Figure 1:
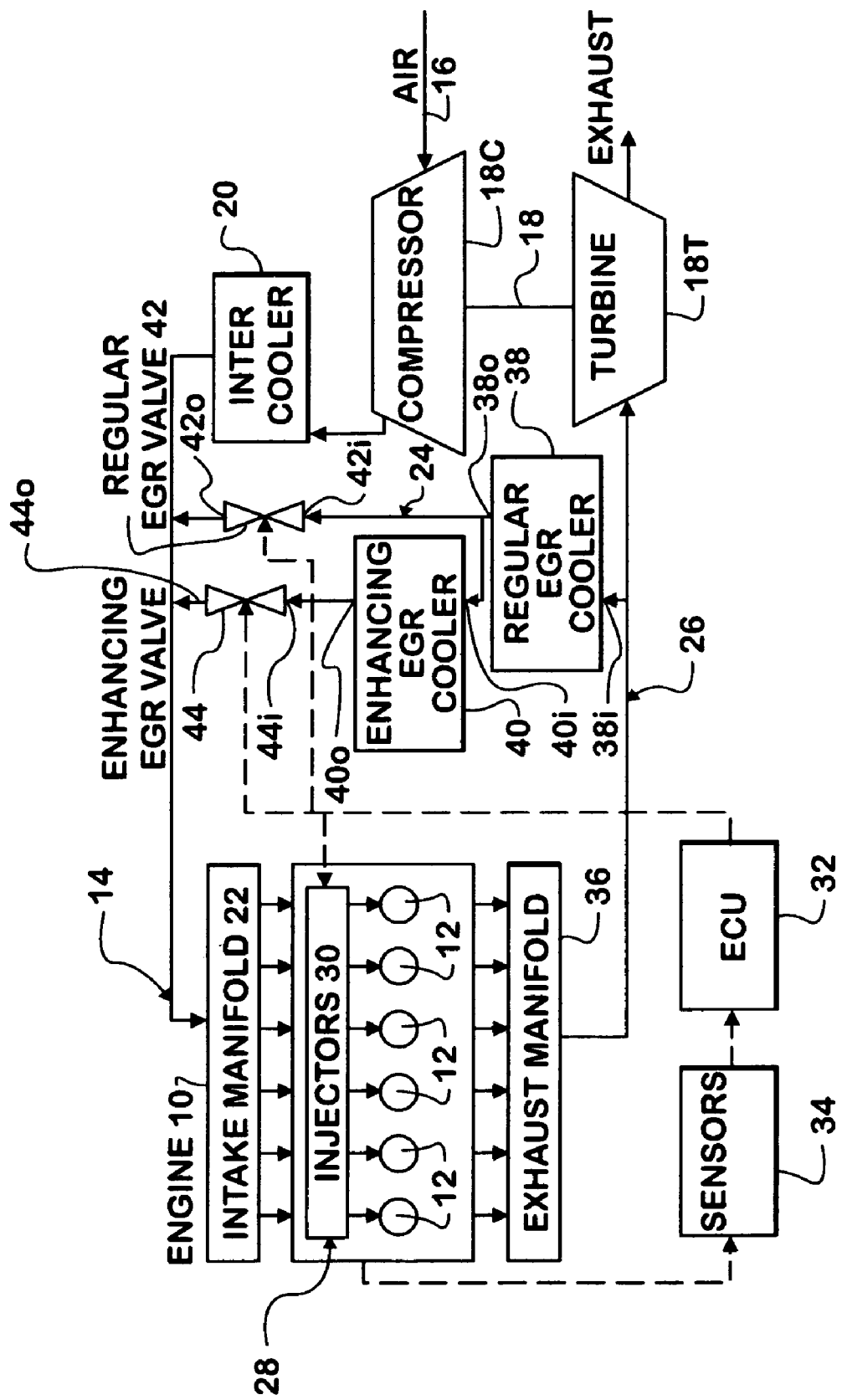
FIG. 1 is a first general schematic diagram of portions of an exemplary diesel engine embodying principles of the present invention.

FIG. 1 shows a portion of an exemplary diesel engine 10 operating in accordance with the inventive strategy for powering a motor vehicle. Engine 10 comprises cylinders 12 within which pistons reciprocate. Each piston is coupled to a respective throw of a crankshaft by a corresponding connecting rod. Intake air is delivered to each cylinder through an intake system 14.

Intake system 14 comprises a fresh air inlet 16 to a compressor 18C of a turbocharger 18. After it has been compressed by compressor 18C, the fresh air is cooled by an intercooler 20 before passing to an intake manifold 22. Air enters a respective cylinder 12 when a respective intake valve or valves at the cylinder is or are open.

For emission control, engine 10 has an exhaust gas recirculation (EGR) system 24 that provides controlled recirculation of engine exhaust gases from an exhaust system 26 of engine 10 to intake system 14.

Engine 10 has a fueling system 28 that comprises fuel injectors 30 for cylinders 12. The engine also has a control system comprising a processor-based engine control unit (ECU) 32 that processes data from various sources to develop various control data for controlling various aspects of engine operation, including fueling system 28 and EGR system 24.

The data processed by ECU 32 may originate at external sources, such as various sensors, 34 generally, and/or be generated internally. Examples of data processed may include engine speed, intake manifold pressure, exhaust manifold pressure, fuel injection pressure, fueling quantity and timing, mass airflow, and accelerator pedal position.

The processing system embodied in ECU 32 can process data sufficiently fast to calculate, in real time, the timing and duration of device actuation to set both the timing and the amount of each injection of fuel into a cylinder. Such control capability is used to provide both alternative diesel combustion and conventional diesel combustion.

Exhaust system 26 comprises an exhaust manifold 36 of engine 10 and a turbine 18T of turbocharger 18. It may also include one or more exhaust treatment devices (not specifically shown) such as a diesel particulate filter (DPF) for trapping soot in the exhaust so that the trapped soot does not escape to the surrounding atmosphere.

In accordance with principles of the invention, EGR system 24 comprises plural EGR coolers, specifically a regular EGR cooler 38 and an enhancing EGR cooler 40 in the illustrated embodiment. System 24 also comprises plural EGR valves, specifically a regular EGR valve 42 and an enhancing EGR valve 44 in the illustrated embodiment.

Regular EGR cooler 38 has an inlet 38i in communication with exhaust system 26 and a outlet 38o that is in communication both with an inlet 40i of enhancing EGR cooler 40 and an inlet 42i of regular EGR valve 42. Regular EGR valve 42 has an outlet 42o in communication with intake systemcl4. Enhancing EGR cooler 40 has an outlet 40o in communication with an inlet 44i of enhancing EGR valve 44. Enhancing EGR valve 44 has an outlet 44o in communication with intake system 14.

Exhaust gases from exhaust manifold 36 are thereby communicated to inlet 38i. When EGR system 24 allows exhaust gases to be recirculated, the recirculated exhaust gases flow into intake manifold 22.

Both EGR valves are under the control of ECU 32. ECU 32 uses instantaneous engine load to select a particular combustion mode for operating engine 10, either an alternative diesel combustion mode, such as HCCI mode, or conventional diesel combustion mode for creating CD combustion, and to then operate the fueling system to fuel the engine according to the strategy of the selected mode. ECU also coordinates control of EGR valves 42, 44 with the selected combustion mode to coordinate use of EGR coolers 38, 40 with the selected combustion mode.

Figure 2:
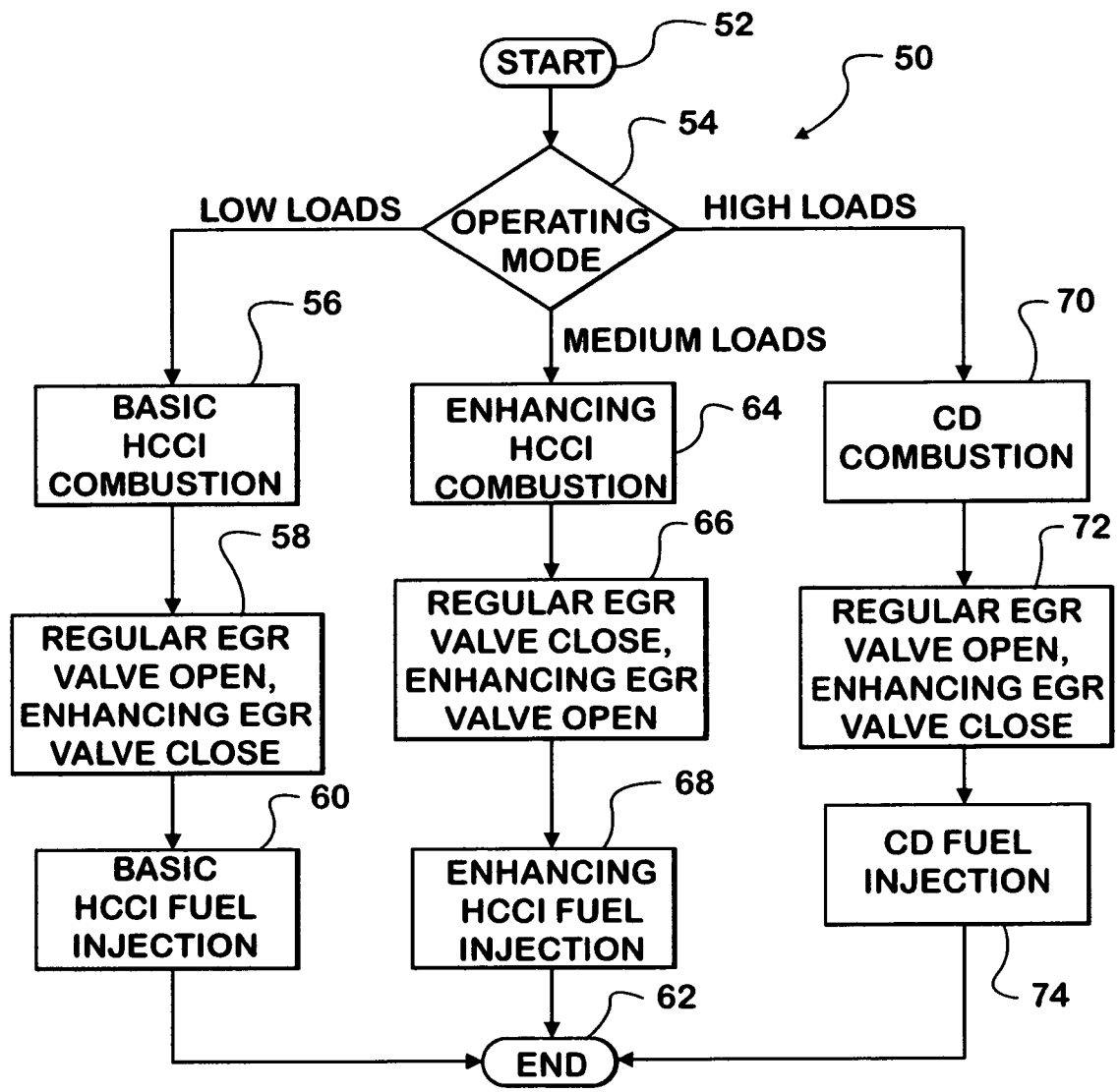
FIG. 2 is a flow diagram illustrating an embodiment of the inventive strategy for the engine of FIG. 1.

FIG. 2 shows a flow diagram 50 for a control strategy that implements principles of the invention in ECU 32. A processor of ECU 32 repeatedly iterates an algorithm that is programmed in the processor in accordance with flow diagram 50. Each iteration begins at a start 52. A step 54 processes engine load data to determine if current engine load is within a low load range, a medium load range, or a high load range.

When processing performed by step 54 discloses that current load is in the low load range, ECU 32 causes fueling system 28 to fuel engine 10 for operation by alternative diesel combustion—basic HCCI combustion is shown by example in FIG. 2—and EGR system 24 to pass recirculated exhaust gas through regular EGR cooler 38, but not enhancing EGR cooler 40. This low range is marked by reference numerals 56, 58, 60 in FIG. 2. Enhancing EGR valve 44 is operated closed by ECU 32 to prohibit flow through enhancing EGR cooler 40. While valve 44 is closed, ECU 32 controls the extent to which regular EGR valve 42 is open thereby selectively restricting flow of exhaust gases through regular EGR cooler 38 as appropriate to specific engine operation. After each iteration's selection for control of fueling and EGR, the algorithm comes to an end 62 to await the next iteration.

When processing performed by step 54 discloses that current load is in the medium load range, ECU 32 causes fueling system 28 to fuel engine 10 for operation by alternative diesel combustion—enhancing HCCI combustion is shown by example in FIG. 2—and EGR system 24 to pass recirculated exhaust gas through both regular EGR cooler 38 and enhancing EGR cooler 40. This medium range is marked by reference numerals 64, 66, 68 in FIG. 2. Regular EGR valve 42 is operated closed by ECU 32 to prohibit flow through itself. While valve 42 is closed, ECU 32 controls enhancing EGR valve 44 to selectively restrict flow of exhaust gases through both regular EGR cooler 38 and enhancing EGR cooler 40 as appropriate to specific engine operation during medium loads. The enhanced cooling of recirculated exhaust gases provided by series flow through two coolers enables alternative diesel combustion to be used in the middle load range.

When processing performed by step 54 discloses that current load is in the high load range, ECU 32 causes fueling system 28 to fuel engine 10 for operation by conventional diesel combustion and EGR system 24 to pass recirculated exhaust gas through regular EGR cooler 38, but not enhancing EGR cooler 40. This high range is marked by reference numerals 70, 72, 74 in FIG. 2. Enhancing EGR valve 44 is operated closed by ECU 32 to prohibit flow through enhancing EGR cooler 40. While valve 44 is closed, ECU 32 controls the extent to which regular EGR valve 42 is open thereby selectively restricting flow of exhaust gases through regular EGR cooler 38 as appropriate to specific engine operation in the high load range.

Selection of HCCI combustion mode causes the engine to be fueled using a fuel injection map, or maps, that result in HCCI combustion. Selection of CD combustion mode causes the engine to be fueled using a fuel injection map, or maps, that result in CD combustion. EGR may also be controlled by its own map, or maps.

The HCCI phase may have one or more discrete injections. The CD phase may also have one or more discrete injections. The invention may be used in engines of various sizes including heavy-duty, medium-duty, and light-duty diesel engines. The algorithm for the invention can be implemented in the processor, provided that the processor has sufficient capacity. The only additional devices required in the illustrated embodiment in comparison to an engine that already has one larger EGR cooler, or perhaps two smaller EGR coolers, and one EGR valve are an additional enhancing EGR cooler and a second EGR valve.

From the foregoing description, the reader can understand that EGR system 24 provides an EGR flow control circuit that controls both flow of recirculated exhaust gases and the temperature of recirculated exhaust gases. The controlled flow is entirely recirculated exhaust gases. Enhancing EGR cooler 40 and enhancing EGR valve 44 form a first branch of the flow control circuit. Regular EGR valve 42 forms a second branch that is in parallel flow relationship with the first branch. Regular EGR cooler 38 forms the third branch through which recirculated exhaust gases always pass.

In the low load range, fueling system 28 injects fuel into cylinders 12 for operating engine 10 by alternative diesel combustion, and the control system, via control of valves 42, 44, configures the flow control circuit to a first circuit configuration that endows the circuit with a capacity for cooling the recirculated exhaust gases appropriate to the low load range for enabling alternative diesel combustion in the first load range.

In the medium load range, fueling system 28 fuels the engine for operation by alternative diesel combustion and the control system configures the flow control circuit to a second circuit configuration that is different from the first circuit configuration and endows the circuit with a capacity for cooling the recirculated exhaust gases appropriate to the second load range for enabling alternative diesel combustion in the second load range.

In the high load range, fueling system 28 fuels the engine for operation by conventional diesel combustion and the control system configures the flow control circuit to a circuit configuration that is different from one of the first and second circuit configurations, in this instance one that is different from the medium load configuration, but the same as the low load configuration.

Figure 3:
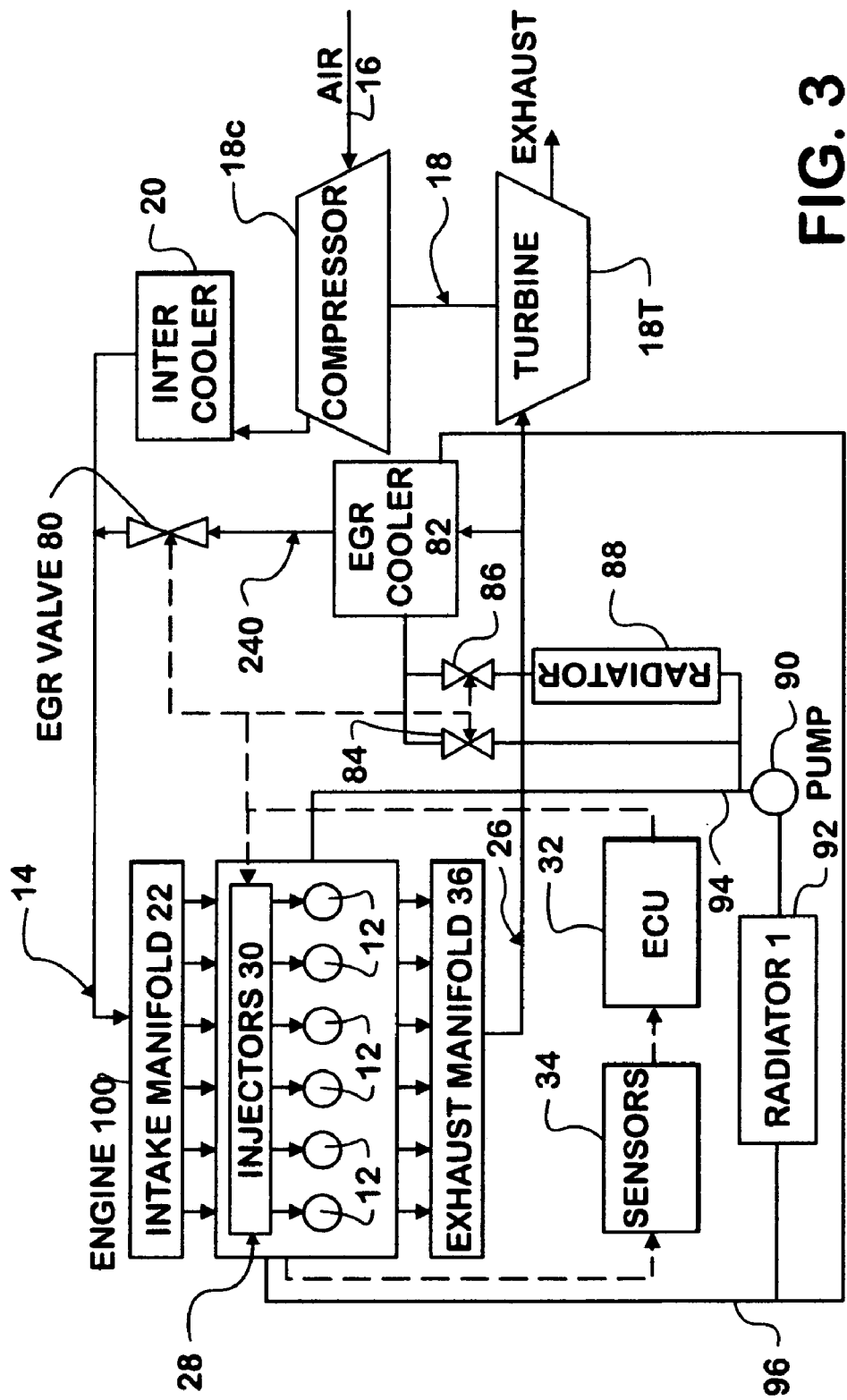
FIG. 3 is a second general schematic diagram of portions of an exemplary diesel engine embodying principles of the present invention.

FIG. 3 shows a portion of another exemplary diesel engine 100 operating in accordance with the inventive strategy for powering a motor vehicle. Engine 100 is like engine 10 except that its EGR system 240 is somewhat different from EGR system 24. Like engine 10, engine 100 comprises cylinders 12, intake system 14, turbocharger 18, intercooler 20, intake manifold 22, exhaust system 26, fueling system 28, fuel injectors 30, a control system comprising ECU 32, various sensors, 34 generally, and exhaust manifold 36.

In accordance with principles of the invention, EGR system 240 comprises a single EGR valve 80, a single EGR cooler 82, two coolant flow control valves 84, 86, and a radiator 88. Valve 86 and radiator 88 are in series flow relationship and together form a first branch of a liquid coolant flow control circuit. Valve 84 forms a second circuit branch that is in parallel flow relationship with the first branch, EGR cooler 82 forms the third circuit branch. Valves 80, 84, and 86 are under the control of the engine control system.

EGR cooler 82 is a liquid-to-air type heat exchanger that has one flow path for recirculated exhaust gases and a separate flow path for liquid coolant. With EGR valve 80 and EGR cooler 82 in series between the intake and exhaust systems, the entire flow of recirculated exhaust gases passes through EGR cooler 82 to the extent allowed by EGR valve 80.

The extent to which exhaust gases passing through cooler 82 are cooled is controlled by the liquid coolant flow control circuit which forms a portion of a liquid flow loop that is completed by connecting the liquid flow control circuit to the engine cooling system. Engine 100 is liquid cooled by forced circulation of liquid engine coolant through coolant passages in structure that contains cylinders 12 to absorb some of the heat of combustion. A pump 90 provides the forced circulation by drawing coolant through a main radiator 92, where it is cooled as it passes through, and pumping the cooler liquid into the engine coolant passages where it absorbs heat. The hotter return coolant flow is directed back to radiator 92.

The liquid flow control circuit has an inlet communicated to the pump outlet 94 at which liquid engine coolant leaves the pump and flows through one of the first and second branches first before flowing through EGR cooler 82. Return flow from the flow control circuit is directed to the entrance of radiator 92. Hence, as pump 90 operates, some of the liquid coolant being pumped can enter the liquid flow control circuit, provided that at least one of the valves 84, 86 is not fully closed.

FIG. 3 shows that ECU 32 receives engine operation data from sensors 34 and/or other sources, processes data, and controls valves 80, 84, and 86 and fueling system 28.

Figure 4:
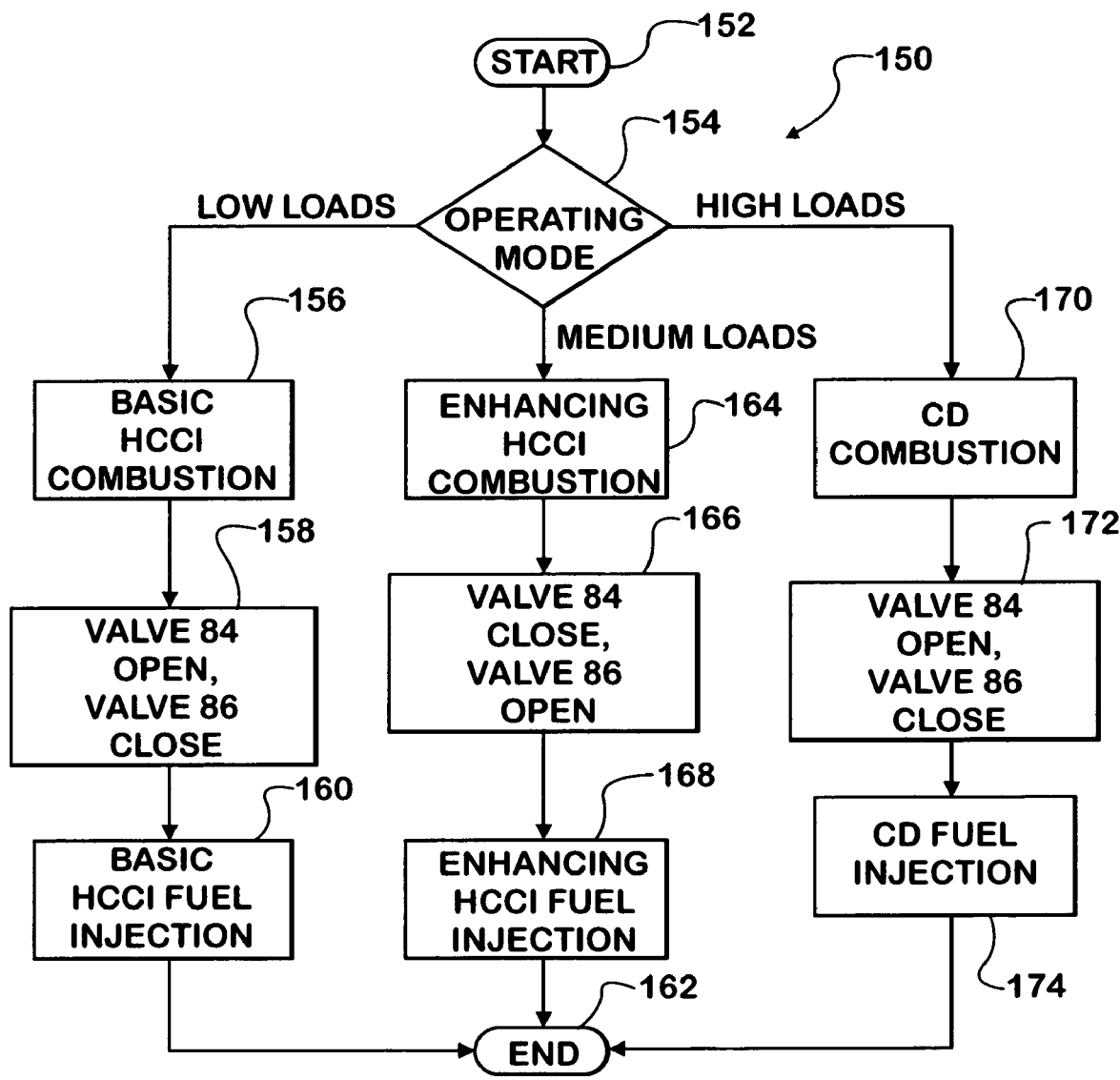
FIG. 4 is a flow diagram illustrating an embodiment of the inventive strategy for the engine of FIG. 3.

FIG. 4 shows a flow diagram 150 for a control strategy that implements principles of the invention in ECU 32 of FIG. 3. A processor of ECU 32 repeatedly iterates an algorithm that is programmed in the processor in accordance with flow diagram 150. Each iteration begins at a start 152. A step 154 processes engine load data to determine if current engine load is within a low load range, a medium load range, or a high load range.

When processing performed by step 154 discloses that current load is in the low load range, a step 156 calls for the engine to operate by alternative diesel combustion (referred to, by example, as "basic" HCCI combustion in FIG. 4). A step 158 causes valve 84 to be open and valve 86 to be closed. To the extent that EGR valve 80 allows EGR flow through EGR cooler 82, that flow is cooled by coolant flow passing directly from pump 90 to cooler 82. A step 160 causes fueling system 28 to fuel engine 100 for operation by alternative diesel combustion (referred to as "basic" HCCI fuel injection in FIG. 4). After each iteration's selection for controlling of fueling and valves 84, 86, the algorithm comes to an end 162 to await the next iteration.

When processing performed by step 154 discloses that current load is in the medium load range, a step 164 calls for the engine to operate by alternative diesel combustion (referred to, by example, as "enhanced" HCCI combustion in FIG. 4). A step 166 causes valve 86 to be open and valve 84 to be closed. To the extent that EGR valve 80 allows EGR flow through EGR cooler 82, that flow is now cooled by coolant flow from pump 90 that has been further cooled by passing through radiator 88 before entering cooler 82. A step 168 causes fueling system 28 to fuel engine 100 for operation by alternative diesel combustion (referred to, by example, as "enhancing" HCCI fuel injection in FIG. 4).

When processing performed by step 154 discloses that current load is in the high load range, a step 170 calls for engine 100 to operate by conventional diesel (CD) combustion. A step 172 causes valve 84 to be open and valve 86 to be closed. To the extent that EGR valve 80 allows EGR flow through EGR cooler 82, that flow is now cooled by coolant flow passing directly from pump 90 to cooler 82. A step 174 causes fueling system 28 to fuel engine 100 for operation by conventional diesel combustion.

Selection of either "basic" or "enhanced" HCCI combustion mode causes engine 100 to be fueled using a respective fuel injection map, or maps, that result in HCCI combustion.

Selection of CD combustion mode causes the engine to be fueled using a fuel injection map, or maps, that result in CD combustion. EGR may also be controlled by its own map, or maps, the same as was true for engine 10.

The HCCI phase may have one or more discrete injections. The CD phase may also have one or more discrete injections. The invention may be used in engines of various sizes including heavy-duty, medium-duty, and light-duty diesel engines. The algorithm for the invention can be implemented in the processor, provided that the processor has sufficient capacity.

The only additional devices required in the embodiment of FIG. 1 in comparison to an engine that already has one larger EGR cooler, or perhaps two smaller EGR coolers, and one EGR valve are an additional enhancing EGR cooler and a second EGR valve. The only additional devices required in the embodiment of FIG. 3 in comparison to an engine that already has one larger EGR cooler, or perhaps two smaller EGR coolers, and one EGR valve are the two coolant valves 84, 86 and radiator 88.

When engine 100 runs at low loads, fresh air enters compressor 18C, which forces the charge air through intercooler 20 to reduce the charge air temperature. After that, the charge air, including any recirculated exhaust gases from the EGR system, enters cylinders 12 through intake manifold 22 and intake valves in the engine cylinder head. A majority of the exhaust gases pass through turbine 18T, and a lesser amount is recirculated through EGR system 240. Cooling is provided without the use of radiator 88. Recirculated exhaust gases combine with fresh air from the outlet of intercooler 20. At the same time, the basic HCCI fuel injection map is selected. Therefore, basic HCCI combustion happens in the engine cylinders. At the same time, a majority of coolant from pump 90 enters the engine block, and a lesser amount enters the liquid flow control circuit to provide regular cooling to the recirculated exhaust gases. The return coolant from the engine block and that from EGR cooler 82 meet at the inlet of radiator 92.

When engine 100 runs at medium loads, more heat can be removed from the recirculated exhaust gases because the liquid coolant entering EGR cooler 82 has passed through radiator 88 instead of coming directly from pump 90. As a result, the intake manifold temperature can be controlled to temperatures that allow alternative diesel combustion. At medium loads, the enhancing HCCI fuel injection map is selected. Therefore, enhancing HCCI combustion occurs in the engine cylinders.

When engine 100 runs at high loads, the CD fuel injection map is selected. Therefore, the CD combustion occurs in the engine cylinders. Coolant entering EGR cooler 82 comes directly from pump 90.

While a presently preferred embodiment of the invention has been illustrated and described, it should be appreciated that principles of the invention apply to all embodiments falling within the scope of the following claims.

What is claimed is:

1. A compression ignition engine comprising:
    a control system comprising a processor for processing data including data indicative of engine load;
    one or more combustion chambers;
    an intake system for conveying charge air to the one or more combustion chambers;
    a fueling system for injecting fuel into the one or more combustion chambers;
    an exhaust system for conveying exhaust gases from the one or more combustion chambers;
    an exhaust gas recirculation system, comprising valves and heat exchangers in a flow control circuit, for controlling both recirculation of some of the exhaust gases to the intake system and temperature of recirculated exhaust gases;
    wherein a first branch of the circuit comprises a first of the valves and a first of the heat exchangers in series, a second branch of the circuit comprises a second of the valves in parallel with the first branch, and a third branch of the circuit comprises a second of the heat exchangers through which flow through the first branch and flow through the second branch are constrained to pass; and
    when a result of the processor processing data indicative of engine load discloses engine load in a low load range, the control system causes the fueling system to fuel the engine for operation by alternative diesel combustion and causes flow through the second and third branches, but not the first branch,
    when a result of the processor processing data indicative of engine load discloses engine load in a medium load range comprising loads greater than those of the low load range, the control system causes the fueling system to fuel the engine for operation by alternative diesel combustion and causes flow through the first and third branches, but not the second branch,
    and when a result of the processor processing data indicative of engine load discloses engine load in a high load range comprising loads greater than those of the medium load range, the control system causes the fueling system to fuel the engine for operation by conventional diesel combustion and causes flow through the second and third branches, but not the first branch.

2. An engine as set forth in claim 1 in which the first and second branches are in upstream flow relation to the third branch.

3. An engine as set forth in claim 1 in which the branches form a portion of a liquid loop through which liquid coolant can circulate, the first heat exchanger exchanges heat between circulating liquid coolant and air, and the second heat exchanger exchanges heat between circulating liquid coolant and recirculated exhaust gas.

4. An engine as set forth in claim 3 wherein the circuit comprises a third valve that is in series flow relationship with the flow of recirculated exhaust gas through the second heat exchanger and that is controlled by the control system for controlling flow of recirculated exhaust gas.

5. An engine as set forth in claim 4 comprising a liquid cooling system for circulating liquid engine coolant through coolant passages in structure that contains the one or more combustion chambers to absorb some of the heat of combustion and through a radiator at which absorbed heat is rejected, and the portion of the liquid loop formed by the branches is connected with the liquid cooling system to complete the loop so that some of the circulating liquid engine coolant circulates through the completed loop.

6. An engine as set forth in claim 5 wherein the liquid cooling system comprises a pump having an inlet connected to the radiator for drawing liquid engine coolant through the radiator and into the pump and an outlet through which liquid engine coolant leaves the pump, and the portion of the liquid loop formed by the branches has an inlet in communication with the pump outlet.

7. A method of operating a compression ignition engine that has a control system comprising a processor for processing data and an exhaust gas recirculation system comprising valves and first and second heat exchangers arranged in a flow control circuit for both controlling recirculation of some of the exhaust gases resulting from combustion of fuel injected by a fuel injection system into one or more combustion chambers to an intake system and controlling temperature of recirculated exhaust gases, the method comprising:

operating the processor to process data indicative of engine load;

when a result of the processor processing data indicative of engine load discloses engine load in a low load range, operating the fuel injection system to fuel the engine for operation by alternative diesel combustion and placing the valves in a state that allows flow of a fluid medium through the second heat exchanger and disallows flow of the medium through the first heat exchanger;

when a result of the processor processing data indicative of engine load discloses engine load in a medium load range comprising loads greater than those of the low load range, operating the fuel injection system to fuel the engine for operation by alternative diesel combustion and placing the valves in a state that allows flow of the medium through both the first and second heat exchangers, and when a result of the processor processing data indicative of engine load discloses engine load in a high load range comprising loads greater than those of the medium load range, operating the fuel injection system to fuel the engine for operation by conventional diesel combustion and placing the valves in a state that allows flow of the medium through the second heat exchanger.

8. A method as set forth in claim 7 comprising allowing the medium to flow through the second heat exchanger only after the medium has first flowed through the first heat exchanger when a result of the processor processing data indicative of engine load discloses engine load in the medium load range.

9. A method as set forth in claim 7 comprising flowing recirculated exhaust gases through at least one of the heat exchangers when a result of the processor processing data indicative of engine load discloses engine load in any of the low, medium, and high load ranges.

10. A method as set forth in claim 9 comprising flowing recirculated exhaust gases serially through both heat exchangers when a result of the processor processing data indicative of engine load discloses engine load in the medium load range.

11. A method as set forth in claim 7 comprising flowing both liquid coolant and recirculated exhaust gases through one of the heat exchangers when a result of the processor processing data indicative of engine load discloses engine load in any of the low, medium, and high load ranges.

12. A method as set forth in claim 11 comprising flowing liquid coolant serially through both heat exchangers when a result of the processor processing data indicative of engine load discloses engine load in the medium load range.

13. A method of operating a compression ignition engine that has a control system comprising a processor for processing data and an exhaust gas recirculation system comprising a flow control circuit that both controls recirculation of some of the exhaust gases resulting from combustion of fuel injected by a fuel injection system into one or more combustion chambers to an intake system and controls temperature of recirculated exhaust gases, the method comprising:

operating the processor to process data indicative of engine load;

when a result of the processor processing data indicative of engine load discloses engine load in a first load range, operating the fuel injection system to fuel the engine for operation by alternative diesel combustion and configuring the flow control circuit to a first circuit configuration that endows the circuit with a capacity for cooling the recirculated exhaust gases appropriate to the first load range for enabling alternative diesel combustion in the first load range;

when a result of the processor processing data indicative of engine load discloses engine load in a second load range comprising loads greater than those of the first load range, operating the fuel injection system to fuel the engine for operation by alternative diesel combustion and configuring the flow control circuit to a second circuit configuration that is different from the first circuit configuration and endows the circuit with a capacity for cooling the recirculated exhaust gases appropriate to the second load range for enabling alternative diesel combustion in the second load range;

and when a result of the processor processing data indicative of engine load discloses engine load in a third load range comprising loads greater than those of the second load range, operating the fuel injection system to fuel the engine for operation by conventional diesel combustion and configuring the flow control circuit to a circuit configuration that is appropriate to the third load range and conventional diesel combustion.

14. A method as set forth in claim 13 wherein the step of configuring the flow control circuit to a circuit configuration when a result of the processor processing data indicative of engine load discloses engine load in a third load range comprises configuring the flow control circuit to the first circuit configuration.

15. A compression ignition engine comprising:
a control system comprising a processor for processing data including data indicative of engine load;
one or more combustion chambers;
an intake system for conveying charge air to the one or more combustion chambers;
a fueling system for injecting fuel into the one or more combustion chambers;
an exhaust system for conveying exhaust gases from the one or more combustion chambers;
an exhaust gas recirculation system, comprising a reconfigurable flow control circuit, for controlling both recirculation of some of the exhaust gases to the intake system and temperature of recirculated exhaust gases;
when a result of the processor processing data indicative of engine load discloses engine load in a first load range, the fuel injection system fuels the engine for operation by alternative diesel combustion and the control system configures the flow control circuit to a first circuit configuration that endows the circuit with a capacity for cooling the recirculated exhaust gases appropriate to the first load range for enabling alternative diesel combustion in the first load range;
when a result of the processor processing data indicative of engine load discloses engine load in a second load range comprising loads greater than those of the first load range, the fuel injection system fuels the engine for operation by alternative diesel combustion and the control system configures the flow control circuit to a second circuit configuration that is different from the first circuit configuration and endows the circuit with a capacity for cooling the recirculated exhaust gases appropriate to the second load range for enabling alternative diesel combustion in the second load range; and when a result of the processor processing data indicative of engine load discloses engine load in a third load range comprising loads greater than those of the second load range, the fuel injection system fuels the engine for operation by conventional diesel combustion and the control system configures the flow control circuit to a circuit configuration that is appropriate to the third load range and conventional diesel combustion.

16. An engine as set forth in claim 15 wherein when a result of the processor processing data indicative of engine load discloses engine load in a third load range, the control system configures the flow control circuit to the first circuit configuration.

* * * * *